(12) United States Patent
Pollack (10) Patent No.: US 11,871,760 B2
(45) Date of Patent: Jan. 16, 2024

(54) SYSTEM AND METHOD OF ACCELERATED INDIVIDUAL BANANA RIPENING

(71) Applicant: Alex J. Pollack, Panama City Beach, FL (US)

(72) Inventor: Alex J. Pollack, Panama City Beach, FL (US)

(*) Notice: Subject to any disclaimer, the term of this patent is extended or adjusted under 35 U.S.C. 154(b) by 0 days.

(21) Appl. No.: 17/579,645

(22) Filed: Jan. 20, 2022

(65) Prior Publication Data

US 2023/0225344 A1 Jul. 20, 2023

(51) Int. Cl.
| | |
|---|---|
| A23B 7/152 | (2006.01) |
| A23L 19/00 | (2016.01) |
| B65D 81/20 | (2006.01) |
| B65D 85/34 | (2006.01) |

(52) U.S. Cl.
CPC .............. *A23B 7/152* (2013.01); *A23L 19/03* (2016.08); *B65D 81/2069* (2013.01); *B65D 85/34* (2013.01)

(58) Field of Classification Search
CPC ..................................................... A23B 7/152
See application file for complete search history.

(56) References Cited

U.S. PATENT DOCUMENTS

| | | | |
|---|---|---|---|
| 3,552,637 A | 1/1971 | Swinford | |
| 3,620,765 A | 11/1971 | McDonnell | |
| 3,683,788 A | 8/1972 | McDonnell et al. | |
| 5,460,841 A | 10/1995 | Herdeman | |
| 6,612,440 B1 | 9/2003 | Agulnik | |
| 8,029,838 B2 | 10/2011 | Forsyth et al. | |
| 2002/0127305 A1 | 9/2002 | Clarke | |
| 2003/0003198 A1 | 1/2003 | Scalise | |
| 2006/0121167 A1 | 6/2006 | Roman | |
| 2010/0233333 A1 | 9/2010 | Varriano-Marston | |
| 2014/0017988 A1* | 1/2014 | Oosterhuis | A23L 3/3418 454/173 |
| 2014/0072682 A1* | 3/2014 | Jeong | A23B 7/152 99/476 |
| 2019/0335776 A1* | 11/2019 | Enssle | B65D 77/04 |
| 2020/0000113 A1* | 1/2020 | Eaton | F25D 17/042 |

FOREIGN PATENT DOCUMENTS

| | | |
|---|---|---|
| WO | 2016063290 | 4/2016 |
| WO | 2018210955 | 11/2018 |

\* cited by examiner

*Primary Examiner* — John J Norton
(74) *Attorney, Agent, or Firm* — Terry M. Sanks, Esq.; Beusse Sanks, PLLC (57) ABSTRACT

A system that includes a plurality of banana containers is provided. Each banana container has a first container end to receive an unpeeled banana and a second container end. The system includes a gas dispensing regulator connected to a plurality of banana containers. The gas dispensing regulator includes a plurality of gas meters having a one-to-one correspondence with the plurality of banana containers. A corresponding meter is connected to the second container end of a corresponding banana container to dispense a corresponding amount of ripening gas into the corresponding banana container. The system can limit the pressure of the ripening gas in the banana container using the closing device to vary the ripening rate of the bananas. This can avoid spoiling the taste of the bananas.

23 Claims, 6 Drawing Sheets

FIG. 6

SYSTEM AND METHOD OF ACCELERATED INDIVIDUAL BANANA RIPENING

FIELD OF THE INVENTION

This disclosure relates generally to systems and methods for controlled ripening of fresh fruits and especially bananas, where the rate of ripening is directed to selectively ripening individual bananas.

BACKGROUND

Currently bananas when bought from the grocer, whether bought in hands of 4, 6 or 8 bananas, all may be unripe together making them uneatable. Later when they reach the stage of ripening, they ripen all at the same time, usually leading to having too many ripe bananas at the same time. Very often, overripe bananas are discarded in the trash which results in wasted money. Depending on the number of bananas available at the grocer, banana hands may include hands in a barely ripe stage, from which to select. Still all the bananas in a hand will ripen at the same time.

The banana changes color in stages of ripening. The color of a banana at each stage may be used to determine the fiber to sugar content. The underripe stage has the highest fiber and lowest sugar content as compared to the overripe stage which has the highest sugar content and lowest fiber. For example, green bananas are considered underripe and can have the lowest sugar content. The next stage is when a banana is yellow. At this stage, the banana is high in fiber and has a low sugar content. During this stage, the banana is yellow and is ripe with high antioxidant and fiber content, which is the preferred stage for consumption. The next stage, the banana is very ripe. At the very ripe stage, the banana has yellow, but is covered with brown spots. So as noted, the yellow stage is the best for consumption, but without intervention, all bananas of a hand will reach this stage simultaneously, possibly leading to waste.

Therefore, there is a need for an improved system of ripening bananas, so that they reach the yellow stage of ripeness consecutively, not simultaneously.

SUMMARY

Embodiments include a system and method of ripening bananas to vary a rate of ripening of the bananas.

An aspect of the embodiments includes a system that includes a plurality of banana containers. Each banana container has a first container end to receive an unpeeled banana and a second container end. The system includes a gas generator including a gas dispensing regulator, the gas regulator is connected with the plurality of banana containers. The gas dispensing regulator includes a plurality of gas metering devices having a one-to-one correspondence with the plurality of banana containers. A corresponding meter is connected to the second container end of a corresponding banana container to dispense a corresponding amount of ripening gas into the corresponding banana container.

Another aspect of the embodiments includes a method that comprises housing, in a plurality of banana containers, unpeeled bananas. Each banana container has a first container end to receive an unpeeled banana and a second container end. The method includes dispensing, by a gas generator connected to the plurality of banana containers, a ripening gas into corresponding banana containers at different flow rates. The gas generator including a plurality of gas meters having a one-to-one correspondence with the plurality of banana containers, a corresponding meter connected to the second container end of the corresponding banana container.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The terms "front," "back," "rear" or "side" are relative terms and used for a frame of reference when describing the components. For example, the "front" may be the "back."

The "side" may be the right side, left side, a front side, or a rear side. The "side" may be a "front" or a "back."

The inventor has determined that by varying a ripening treatment applied to fruit such as bananas, a consumer can vary the ripening of one or more individual bananas to be ripe on different days. The ripening treatment may include varying at least one of the exposure level and pressure of ethylene gas to accelerate the ripening of the bananas at different rates.

The controlled banana ripening system, as described herein, allows a consumer to selectively induce a certain level of ethylene gas and retain a certain concentration of ethylene gas applied to the skin of a banana to control the ripening of a banana or pair of bananas.

The controlled banana ripening system varies the ripening of a banana through variations in the thickness of a banana container, to retain a specific concentration of ethylene gas within the banana container, for example. By achieving a variation in one or more of the pressure, amount, and concentrations of ethylene gas, within in different containers, the system controls the ripening of the banana in each container at different rates and not simultaneously.

For example, the consumer can buy a hand of green bananas and ripening each banana sequentially or on different days by storing green bananas in the banana ripening system, resulting in the treated bananas becoming ripe sequentially, approximately on different days. However, most bananas that are sold in grocers are already exposed to an amount of ethylene gas to begin a ripening process.

Additionally, the consumer can buy an amount of partially ripen bananas and ripening each unripen banana sequentially or on different days by storing of the unripen bananas in the banana ripening system, resulting in the treated bananas becoming ripe sequentially, approximately on different days.

Figure 1:
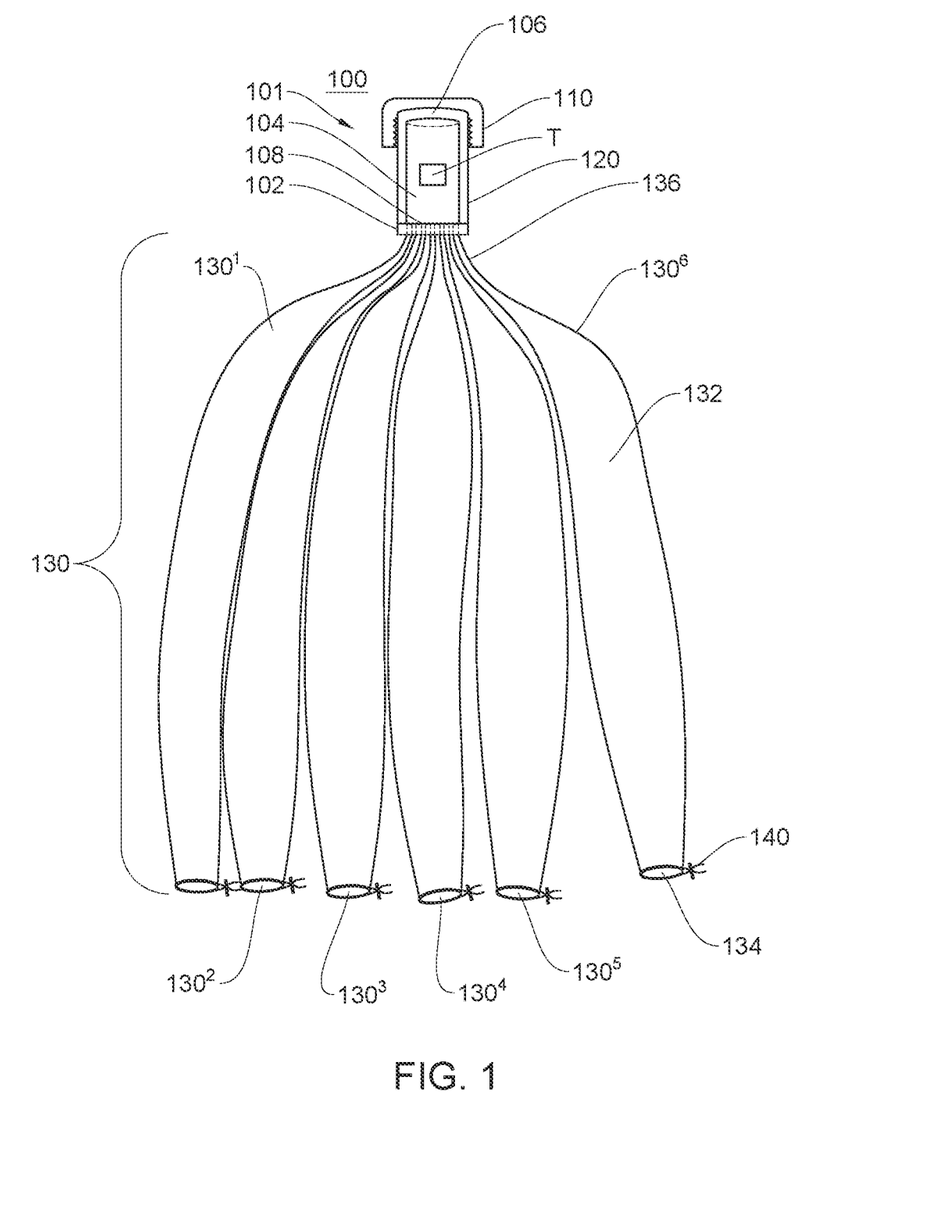
FIG. 1 illustrates a controlled banana ripening system according to embodiments herein.
Figure 2:
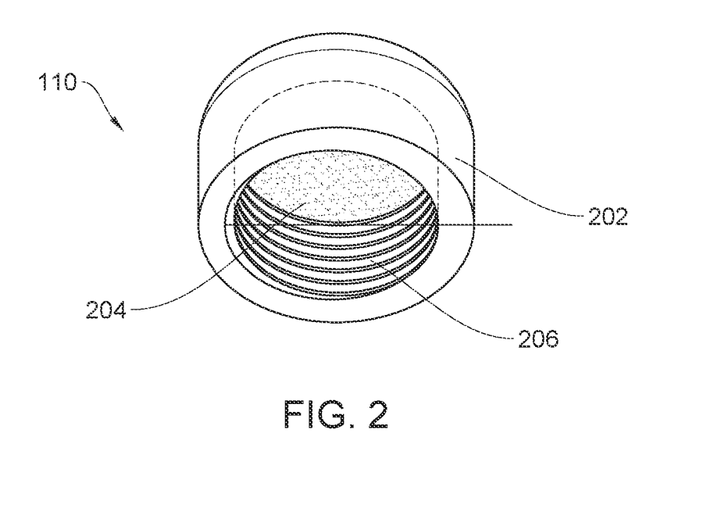
FIG. 2 illustrates a cap for the gas generator compartment of the system of FIG. 1.
Figure 3:
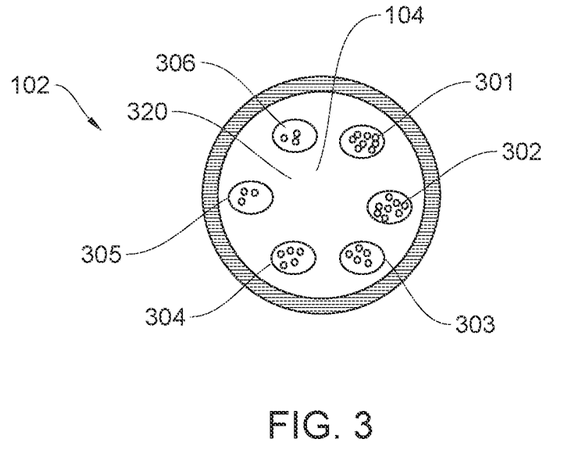
FIG. 3 illustrates an end view of the gas dispensing regulator of the system of FIG. 1.
Figure 4:
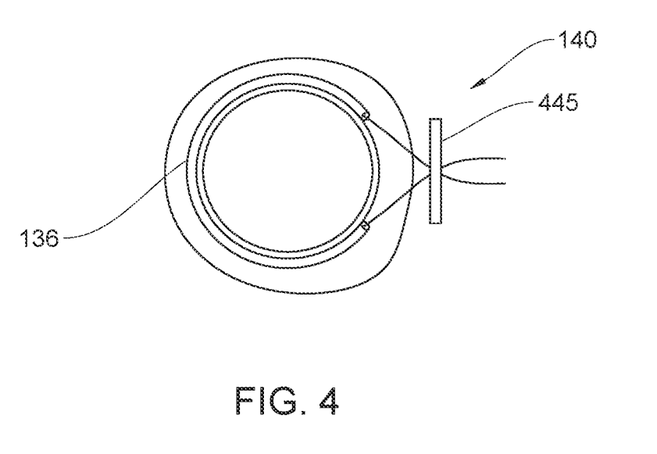
FIG. 4 illustrates an end view of the banana container cinching closure device of FIG. 1.
Figure 5:
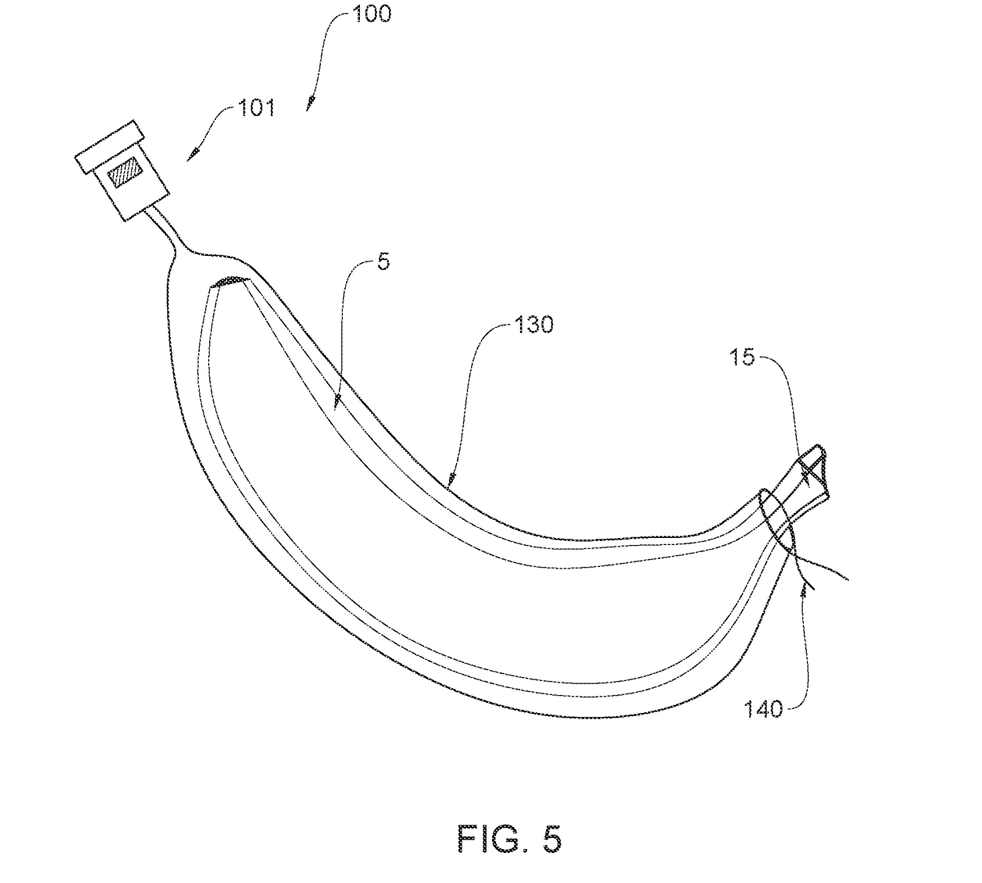
FIG. 5 illustrates a side view of the system with a banana loaded in a banana container, with the end closure tightened.

The banana ripening system 100 will be described in relation to FIGS. 1-5. FIG. 1 illustrates a controlled banana ripening system according to embodiments herein. FIG. 2 illustrates a cap device 110 of the gas generator compartment of FIG. 1. FIG. 3 illustrates an end view of the gas dispensing regulator of FIG. 1. FIG. 4 illustrates an end view of the banana container cinching closure of FIG. 1. FIG. 5 illustrates a side view of the system 100 with a banana loaded in a banana container.

With reference to FIG. 1 the system 100 may include a plurality of banana containers 130, each container 130 has a first container end 134 to receive an unpeeled banana 5 (FIG. 4) and a second container end 136. In this example, the number of banana container 130 is six denoted by $130^1$, $130^2$, $130^3$, $130^4$, $130^5$ and $130^6$. The system may have any number of banana containers greater than one. The number of sleeves may be 2-8, for example. Each container is configured to receive therein an unpeeled banana, as best seen in FIG. 5. The banana may be a green banana.

The banana container 130 comprises a housing 132 having the first container end 134 and the second container end 136 and a wall thickness to surround skin of the unpeeled banana between the first container end 134 and the second container end 136. The housing 132 of the container 130 may include polyethylene material, a polymer material or other material that is semi-permeable to ethylene gas (C2H4). The thickness and density of material of the container 130 allows the ethylene to be retained at different concentration levels causing the bananas to ripen at different rates in the container.

The second container end 136 of the housing 132 may have a narrowed end compared to the diameter of the housing 132. The first container end 134 of the housing may be cinched closed with a closing device 140. The banana is configured to be placed in the housing 132 by opening the first container end 134 large enough to receive the size of the banana. The housing 132 may be flexible.

In some embodiments, the plurality of banana containers 130 may include a first pair of banana containers $130^1$, $130^2$ having a first housing wall thickness, a second pair of banana containers $130^3$, $130^4$ having a second housing wall thickness less than the first housing wall thickness, and a third pair of banana containers $130^5$, $130^6$ having a third housing wall thickness less than the second housing wall thickness, ranging from 2-6 mil.

Referring also to FIG. 4, the banana container may include a closing device 140 coupled to the first container end of the housing. The closing device 140 may be made of a resilient band with the ability to lock, via lock or fastener 445, the closing device 140 around the banana, forming a seal around the neck of the banana finger. In the case of a banana finger, the closing device 140 may close the first container end around the neck of the banana.

The banana container 130 may be in the shape of a banana sleeve for receiving a banana without bruising or harming the skin of the banana. In another embodiment, the container 130 may be of a shape and size to hold more than a single banana. As a non-limiting example, the consumer may wish to use the banana container 130 to ripen two bananas at a same rate where the other containers may already contain other bananas.

The system 100 may include a gas generator 101 including a gas dispensing regulator 102, the gas dispensing regulator 102 is connected with the plurality of banana containers 130. The gas generator 101 includes a housing 120 having an interior compartment 104 for placement of material for the creation of ethylene gas, for example. The gas dispensing regulator 102 may be connected or integrated into the housing 120.

The gas dispensing regulator 102 may include a plurality of gas meters 301-306, having a one-to-one correspondence with the banana containers $130^1$-$130^6$. A corresponding meter 301-306 is connected to the second container end 136 of a corresponding banana container 130 to dispense a corresponding amount of ripening gas into the corresponding banana container 130 from the compartment 104 of the housing 120.

The gas generator 101 may include a removable cap device 110 that may be used to open and close the compartment 104. The cap device 110 to be connected to a first compartment end 106 of housing 120, the first compartment end is configured to be a capped end. The housing 120 also includes a second compartment end 108 opposite the first compartment end. The gas dispensing regulator 102 is connected to integrated with the second compartment end 108 to form a gas regulating end 108. The removable cap device 110 can be selectively removed from the first compartment end 106 to replenish the gas generating material (or tablet T) in the compartment 104.

With reference to FIG. 2, the removable cap device 110 may include a cap body 202 having a hole 204 in a bottom end 204. The interior walls of the cap body 202 includes threads 206 for opening and closing the compartment 104. As can be appreciated, other closing mechanism may be used, such as Snap-on caps, hinge lids or the like. The housing 120 may be tubular with a cap on one end and a gas regulator on the other end, in which a tablet T of ethylene (gas) generating material can be placed. When the tablet comes into contact with a minimum level of moisture, it begins to generate ethylene gas. The moisture may come from the air or by using a small piece of moist material such as a paper towel or other material.

With reference to FIG. 3, the gas dispensing regulator 102 may include a substrate 320 at the second compartment end 108 of the compartment 104. The substrate 320 includes the plurality of gas meters 301-306, which dispense a ripening gas into the corresponding banana containers $130^3$-$130^4$, simultaneously, but at different dispensing rates. By way of non-limiting example, the plurality of gas meters 301-306 include a first pair of gas meters 301-302 to dispense a first corresponding amount of the ripening gas into the first pair of banana containers $130^1$-$130^2$, simultaneously; a second pair of gas meters 303-304 to dispense a second corresponding amount of the ripening gas into the second pair of banana containers $130^3$-$130^4$, simultaneously, and a third pair of gas meters 305-306 to dispense a third corresponding amount of the ripening gas into the third pair of banana containers $130^5$-$130^6$, simultaneously. The second corresponding amount of ripening gas is less than the first corresponding amount. The third corresponding amount is less than the second corresponding amount. For illustrative purposes, the first pair of meters are coupled in a one-to-one correspondence to the first pair of banana containers $130^1$-$130^2$. Each meter (i.e., meter 301) includes a plurality of orifices through which a fluid, air, or ethylene gas (C2H4) flows into the corresponding one banana container (i.e., container $130^1$). By way of non-limiting example, the number of orifices in the first pair of gas meters 301-302 is greater than the number of orifices of the second pair of gas meters 303-304 and the third pair of gas meters 305-306. The orifice diameter of each orifice is essentially the same. In other embodiments, the orifice size can change so that the rate of dispensing the gas can vary.

In other embodiments, the number of orifices may be the same, but the diameter of the orifice may vary to vary the rate of gas flow through the meter and into the corresponding container.

The system 100 provides for the treatment (exposing to a process) of up to three sets of bananas pairs, which are individually and uniquely treated to arrive at different ripening levels and schedules. In some embodiments, two people may want to have a ripened banana on the same day. This system 100 allows two bananas to be ripened simultaneously.

In other embodiments, the user may place banana in alternate banana housings to delay the ripening of the banana using the same system 100 based on the thickness of the banana container and the meter flow of the ripening gas. Still further, a user may vary the placement of the banana in the banana housing according to their own eating choices.

Although the embodiment shown includes pairs of banana containers with the same wall thickness, alternately each banana container may have a different wall thickness. In such an embodiment, the first container may have the thickest wall thickness and the last banana container would have the thinnest wall thickness.

Still further, the flow rates of the meters can be varied so that each meter has a different rate as compared to the next meter in the series.

As shown in FIG. 5, a corresponding banana container houses a corresponding one banana finger of a hand of bananas. The ripening rate is controlled by the plurality of banana containers having varying wall thicknesses such that the wall thicknesses and the rate at which the corresponding amount of the ripening gas is dispensed to a respective banana container are varied to control the ripening rate of the unpeeled banana. For example, the thicker the wall thickness of the banana container the faster the ripening rate. The slower the rate of dispensing of the ripening gas into the banana container, the slower the rate of ripening. Both of these parameters can be controlled to sequentially ripen a banana either through acceleration or delayed ripening as compared to the ripening rate that occurs naturally in air.

In some embodiments, varying the molecular density of the polyethylene film, for example from low-density polyethylene (LDPE) to high-density polyethylene (HDPE), the level of ethylene gas can also be controlled. Therefore, the permeability is controlled by a combination of polyethylene density and thickness, to achieve the ideal permeability for each set of banana containers.

The inventor has determined that storage of green bananas in the system for one day (minimum 24 hours) results in bananas being ripened sequentially, on different days. The system 100 allows consumers to ripen bananas at different speeds to achieve the goal of bananas from the same bunch being ripe, on different days.

The system may include a device that generates ethylene gas (capsule or material that contains an ethylene generator at a particular moisture level) at a low concentration. A tablet of ethylene generating material is placed in the compartment and the moisture from the connected bananas in their compartments is sufficient to react and generate ethylene gas. A secondary alternative material also may be use, that is wetted on the surface, prior to insertion into the compartment, starting the gas generating reaction that then feeds the ethylene gas into three pairs of banana containers at different rates and concentrations.

System 100 provides a means to introduce different amounts of ethylene gas to individual sets of bananas (such as banana sleeves of various thicknesses). System 100 provides a consumer the ability to vary the acceleration of ripening of bananas to achieve the goal of bananas from the same bunch being ripe, on different days.

Figure 6:
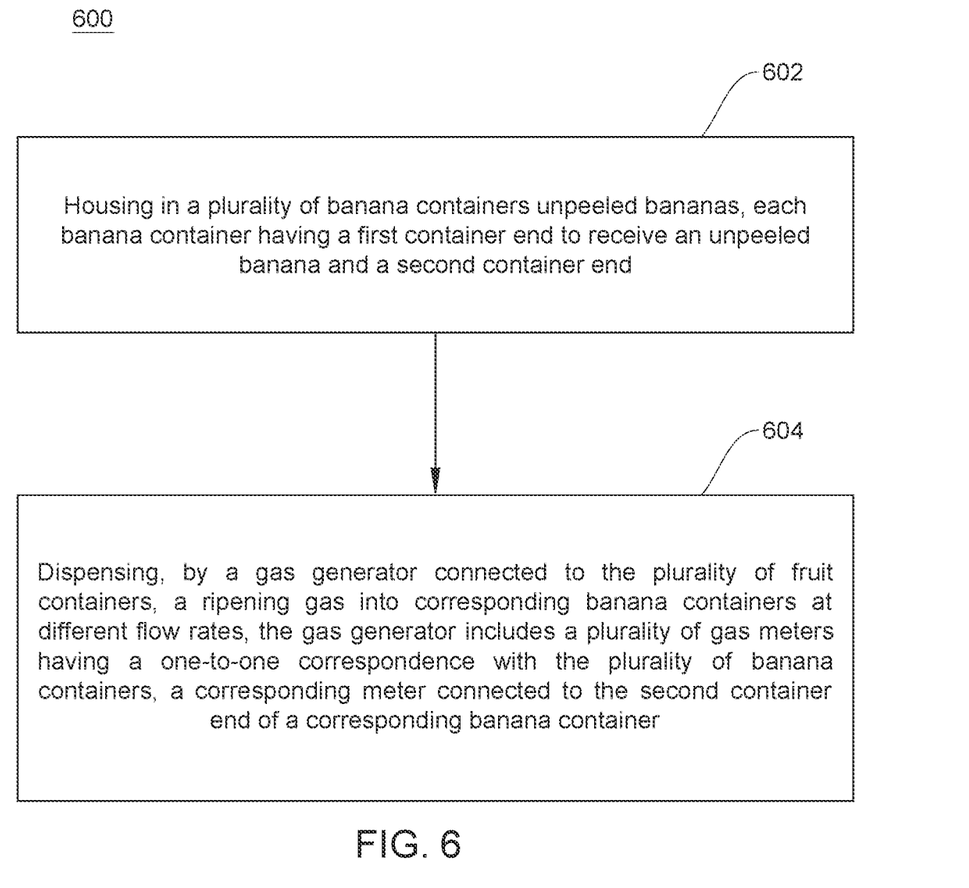
FIG. 6 illustrates a flowchart of ripening a hand of bananas.

FIG. 6 illustrates a flowchart of a method 600 for ripening a number of bananas. A method 600 for treating bananas to control the ripening of such bananas will now be described. The method 600 may include housing in a plurality of banana containers unpeeled bananas, each banana container having a first container end to receive an unpeeled banana and a second container end, at 602. The method 600 may include, dispensing by a gas generator connected to the plurality of banana containers, a ripening gas into corresponding banana containers at different flow rates, at 604. The gas generator including a gas dispensing regulator that may include a plurality of gas meters having a one-to-one correspondence with the plurality of banana containers, a corresponding meter connected to the second container end of the corresponding banana container.

Since each banana container 130 includes a housing 132 having the first container end 134 and the second container end 136 and a wall thickness to surround skin of the unpeeled banana between the first container end and the second container end, the method may include varying a rate of ripening based on the wall thickness of each banana container.

Since the plurality of banana containers 130 may include pairs of banana containers, each banana container of the pair has the same wall thickness and each pair of banana containers have a different wall thickness than another pair of banana containers, then the method may include varying the rate of ripening of the fresh (green) bananas in pairs.

Since the plurality of gas meters 301-306 may be in pairs, the method may include varying the rate of ripening based on the wall thickness of each banana container in the pairs of banana containers and the dispensed amount of the ripening gas from the gas meter pairs.

The method may include dispensing an amount of ethylene gas by the gas generator, the ethylene gas being the ripening gas.

Since each banana container 130 may include a closing device 140 coupled to the first container end of the banana container 130 to control pressure of the ripening gas in the banana container, then the method may include controlling or limiting the pressure of the ripening gas in the banana container 130 using the closing device 140 to vary the ripening rate of the bananas.

The method may also include removing the cap device 110 from the first compartment end 106. Then, the method may include adding a gas generating material (or tablet T) to the compartment 104. The method may include activating the gas generating material (or tablet T) in the compartment 104 to generate the ripening gas, and placing the cap device 110 on the first compartment end 106.

Although the embodiments herein are directed to bananas, including green bananas, the system may be applied to other fresh fruit where additional ripening may be desired and can be accomplished to a ripening gas.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

I claim:

1. A system comprising:
   a plurality of banana containers, each banana container having a first container end to receive an unpeeled banana and a second container end; and
   a gas generator including a gas dispensing regulator connected to the plurality of banana containers to dispense a ripening gas into corresponding banana containers at different flow rates, the gas dispensing regulator including a plurality of gas meters having a one-to-one correspondence with the plurality of banana containers, a corresponding meter connected to the second container end of a corresponding banana container to dispense a corresponding amount of the ripening gas into the corresponding banana container to ripen the unpeeled banana in the corresponding banana container in response to the corresponding amount of the ripening gas, and the gas generator comprises:
   a compartment having a first compartment end and a second compartment end; and
   a removable cap device coupled to the first compartment end to selectively replenish the ripening gas in the compartment,
   wherein the gas dispensing regulator is connected at the second compartment end opposite the first compartment end of the compartment, the gas dispensing regulator including the plurality of gas meters.

2. The system of claim 1, wherein each banana container comprises a housing having the first container end and the second container end and a wall thickness to surround skin of the unpeeled banana between the first container end and the second container end.

3. The system of claim 2, wherein the plurality of banana containers comprises pairs of banana containers, each banana container of the pair having equal wall thicknesses and each pair of banana containers having a different wall thickness than another pair of banana containers.

4. The system of claim 2, wherein the plurality of banana containers comprises:
   a first pair of banana containers having a first housing wall thickness;
   a second pair of banana containers having a second housing wall thickness less than the first housing wall thickness; and
   a third pair of banana containers having a third housing wall thickness less than the second housing wall thickness.

5. The system of claim 4, wherein the plurality of gas meters comprises:
   a first pair of gas meters dispensing a first corresponding amount of the ripening gas into the first pair of banana containers, simultaneously;
   a second pair of gas meters dispensing a second corresponding amount of the ripening gas into the second pair of banana containers, simultaneously, the second corresponding amount being less than the first corresponding amount; and a third pair of gas meters dispensing a third corresponding amount of the ripening gas into the third pair of banana containers, simultaneously, the third corresponding amount being less than the second corresponding amount.

6. The system of claim 1, wherein the unpeeled banana is an unripe banana.

7. The system of claim 1, wherein the plurality of banana containers have varying wall thicknesses such that the wall thicknesses and a rate at which the corresponding amount of the ripening gas are dispensed to a respective banana container controls the ripening rate of the unpeeled banana.

8. The system of claim 7, wherein each banana container further comprises a closing device coupled to the first container end of the banana container to control a pressure of the ripening gas in the banana container.

9. The system of claim 1, wherein the plurality of banana containers comprises polyethylene material.

10. A method comprising:
housing, in a plurality of banana containers, unpeeled bananas, each banana container having a first container end to receive an unpeeled banana and a second container end and each banana container comprising a housing having the first container end and the second container end and a wall thickness to surround skin of the unpeeled banana between the first container end and the second container end;
dispensing, by a gas generator connected to the plurality of banana containers, a ripening gas into corresponding banana containers at different flow rates, the gas generator including a plurality of gas meters having a one-to-one correspondence with the plurality of banana containers, a corresponding meter connected to the second container end of a corresponding banana container to dispense a corresponding amount of ripening gas into the corresponding banana container;
ripening each unpeeled banana in each corresponding banana container in response to the corresponding amount of the ripening gas dispensed; and
varying a rate of ripening based on the wall thickness of each banana container.

11. The method of claim 10, wherein the gas generator comprises:
a compartment having a first compartment end and a second compartment end,
gas dispensing regulator at the second compartment end, the gas dispensing regulator including the plurality of gas meters, and
a removable cap device coupled to the first compartment end to selectively replenish the ripening gas in the compartment; and
the method further comprising:
removing the cap device from the first compartment end,
adding a gas generating material to the compartment,
activating the gas generating material in the compartment to generate the ripening gas, and
placing the cap device on the first compartment end.

12. The method of claim 10, wherein the plurality of banana containers comprises pairs of banana containers, each banana container of the pair having equal wall thicknesses and each pair of banana containers having a different wall thickness than another pair of banana containers; and
the method further comprising:
varying the rate of ripening of banana pairs.

13. The method of claim 10, wherein the plurality of banana containers comprises:

a first pair of banana containers having a first housing wall thickness;
a second pair of banana containers having a second housing wall thickness less than the first housing wall thickness; and
a third pair of banana containers having a third housing wall thickness less than the second housing wall thickness.

14. The method of claim 13, wherein the plurality of gas meters comprises:
a first pair of gas meters dispensing a first corresponding amount of the ripening gas into the first pair of banana containers, simultaneously,
a second pair of gas meters dispensing a second corresponding amount of the ripening gas into the second pair of banana containers, simultaneously, the second corresponding amount being less than the first corresponding amount, and
a third pair of gas meters dispensing a third corresponding amount of the ripening gas into the third pair of banana containers, simultaneously, the third corresponding amount being less than the second corresponding amount; and
the method further comprising:
varying the rate of ripening based on the wall thickness of each banana container in the pairs of banana containers and an amount of the dispensed ripening gas from the gas meter pairs.

15. The method of claim 10, wherein the unpeeled banana is an unripe banana.

16. The method of claim 10, wherein the dispensing of the ripening gas includes dispensing an amount of ethylene gas, the ethylene gas being the ripening gas.

17. The method of claim 10, wherein each banana container further comprises a closing device coupled to the first container end of the banana container to control pressure of the ripening gas in the banana container; and
the method further comprising:
limiting pressure of the ripening gas in the banana container using the closing device to vary a ripening rate of the bananas.

18. The method of claim 10, wherein the plurality of banana containers comprises polyethylene material.

19. A system comprising:
a plurality of banana containers, each banana container having a first container end to receive an unpeeled banana and a second container end; and
a gas generator including a gas dispensing regulator connected to the plurality of banana containers to dispense a ripening gas into corresponding banana containers at different flow rates, the gas dispensing regulator including a plurality of gas meters having a one-to-one correspondence with the plurality of banana containers, a corresponding meter connected to the second container end of a corresponding banana container to dispense a corresponding amount of the ripening gas into the corresponding banana container to ripen the unpeeled banana in the corresponding banana container in response to the corresponding amount of the ripening gas,
wherein the plurality of banana containers comprises pairs of banana containers, each banana container of the pair having equal wall thicknesses to surround skin of the unpeeled banana and each pair of banana containers having a different wall thickness than another pair of banana containers.

20. A system comprising:
a plurality of banana containers, each banana container having a first container end to receive an unpeeled banana and a second container end; and
a gas generator including a gas dispensing regulator connected to the plurality of banana containers to dispense a ripening gas into corresponding banana containers at different flow rates, the gas dispensing regulator including a plurality of gas meters having a one-to-one correspondence with the plurality of banana containers, a corresponding meter connected to the second container end of a corresponding banana container to dispense a corresponding amount of the ripening gas into the corresponding banana container to ripen the unpeeled banana in the corresponding banana container in response to the corresponding amount of the ripening gas,
wherein the plurality of banana containers have varying wall thicknesses such that the wall thicknesses and a rate at which the corresponding amount of the ripening gas are dispensed to a respective banana container controls the ripening rate of the unpeeled banana.

21. A system comprising:
a plurality of banana containers, each banana container having a first container end to receive an unpeeled banana and a second container end; and
a gas generator including a gas dispensing regulator connected to the plurality of banana containers to dispense a ripening gas into corresponding banana containers at different flow rates, the gas dispensing regulator including a plurality of gas meters having a one-to-one correspondence with the plurality of banana containers, a corresponding meter connected to the second container end of a corresponding banana container to dispense a corresponding amount of the ripening gas into the corresponding banana container to ripen the unpeeled banana in the corresponding banana container in response to the corresponding amount of the ripening gas,
wherein the plurality of banana containers comprises polyethylene material.

22. A method comprising:
housing, in a plurality of banana containers, unpeeled bananas, each banana container having a first container end to receive an unpeeled banana and a second container end;
dispensing, by a gas generator connected to the plurality of banana containers, a ripening gas into corresponding banana containers at different flow rates, the gas generator including a plurality of gas meters having a one-to-one correspondence with the plurality of banana containers, a corresponding meter connected to the second container end of a corresponding banana container to dispense a corresponding amount of ripening gas into the corresponding banana container, wherein the gas generator comprises a compartment having a first compartment end and a second compartment end, a gas dispensing regulator at the second compartment end, the gas dispensing regulator including the plurality of gas meters, and a removable cap device coupled to the first compartment end to selectively replenish the ripening gas in the compartment;
removing the cap device from the first compartment end;
adding a gas generating material to the compartment;
activating the gas generating material in the compartment to generate the ripening gas; placing the cap device on the first compartment end; and
ripening each unpeeled banana in each corresponding banana container in response to the corresponding amount of the ripening gas dispensed.

23. A method comprising:
housing, in a plurality of banana containers, unpeeled bananas, each banana container having a first container end to receive an unpeeled banana and a second container end;
dispensing, by a gas generator connected to the plurality of banana containers, a ripening gas into corresponding banana containers at different flow rates, the gas generator including a plurality of gas meters having a one-to-one correspondence with the plurality of banana containers, a corresponding meter connected to the second container end of a corresponding banana container to dispense a corresponding amount of ripening gas into the corresponding banana container; and
ripening each unpeeled banana in each corresponding banana container in response to the corresponding amount of the ripening gas dispensed,
wherein the plurality of banana containers comprises polyethylene material.

* * * * *